United States Patent [19]

Koike et al.

[11] Patent Number: 5,391,461
[45] Date of Patent: Feb. 21, 1995

[54] OPTICAL RECORDING MEDIUM AND RECORDING METHOD

[75] Inventors: Tadashi Koike, Kamakura; Shin Aihara; Keiji Ueno, both of Yokohama; Shinichi Murakami, Kamkura; Sumio Hirose, Yokohama, all of Japan

[73] Assignee: Mitsui Toatsu Chemicals, Inc., Tokyo, Japan

[21] Appl. No.: 35,097

[22] Filed: Mar. 19, 1993

Related U.S. Application Data

[63] Continuation of Ser. No. 718,881, Jun. 21, 1991, abandoned.

[30] Foreign Application Priority Data

Jun. 22, 1990 [JP] Japan .................. 2-162597

[51] Int. Cl.$^6$ .............................. G11B 7/24
[52] U.S. Cl. ...................... 430/271; 430/945; 369/284
[58] Field of Search ............. 430/271, 495, 945, 275; 540/139, 140; 369/284, 275.4

[56] References Cited

U.S. PATENT DOCUMENTS

| | | | |
|---|---|---|---|
| 4,529,688 | 7/1985 | Law et al. | 540/140 |
| 4,940,618 | 7/1990 | Hamada et al. | 430/945 |
| 4,946,762 | 8/1990 | Albert et al. | 430/495 |
| 5,090,009 | 2/1992 | Hamada et al. | 369/284 |
| 5,124,067 | 6/1992 | Itoh et al. | 540/140 |
| 5,280,114 | 1/1994 | Itoh et al. | 540/140 |

FOREIGN PATENT DOCUMENTS

| | | | |
|---|---|---|---|
| 0186404 | 7/1986 | European Pat. Off. | 369/275.4 |
| 353393 | 4/1989 | European Pat. Off. | |
| 0373643 | 6/1990 | European Pat. Off. | 540/140 |

OTHER PUBLICATIONS

Chemical Abstracts vol 111, No. 10, pp. 657, Sep. 4, 1989.
Chemical Abstracts, vol. 110, No. 12, pp. 683, Mar. 20, 1989.

*Primary Examiner*—Charles L. Bowers, Jr.
*Assistant Examiner*—Martin J. Angebrandt
*Attorney, Agent, or Firm*—Millen, White, Zelano & Branigan

[57] ABSTRACT

An optical recording medium for pit length recording with excellent error rate and jitter value which has a transparent injection molded resin substrate, a recording layer containing a phthalocyanine dye of formula (1) overlying the substrate and a covering layer overlying the recording layer. Also, a method of optical recording by pit length recording with a focused laser beam using an optical recording medium as described above.

18 Claims, No Drawings

OPTICAL RECORDING MEDIUM AND RECORDING METHOD

This is a continuation of application Ser. No. 07/718,881, filed Jun. 21, 1991, now abandoned.

BACKGROUND OF THE INVENTION

1. Field of the Invention

The present invention relates to an optical recording medium, and more particularly, to an optical recording medium in which a large amount of information can be recorded, and a method for recording the information.

Furthermore particularly, the present invention relates to an optical recording medium capable of pit length recording various kinds of information such as image, sound, code data and the like by irradiating the optical recording medium of a single plate type having a dye-containing recording layer with a semiconductor laser beam, a pit length recording method, and an optically pit length recorded medium recorded by means of pit length.

2. Description of the Related Art

In optical recording media having a dye-containing recording layer capable of writing by laser beam, the recording film can be formed by spin coating, and therefore, the media are excellent in productivity, economy and yield as compared with optical recording media having a recording layer composed of an inorganic thin film which is produced by vacuum technique. In particular, optical recording media having a phthalocyanine dye-containing recording layer are preferable since the media are excellent in durability.

Law, U.S. Pat. No. 4,492,750 discloses an optical recording medium using an alkyl substituted phthalocyanine dye as a recording layer. However, in order to protect the recording layer, a protective plate should be laminated on the recording layer with air gap. In the case of the form of the simplest medium structure of a single plate type which is so constituted that a thin film protective layer is directly provided on the phthalocyanine dye recording layer, the protective layer affects upon recording and therefore, it is difficult to form a recorded media with low error rate. In particular, it is more difficult to provide pit length recording media capable of giving a large amount of record.

Even if the recording is possible, the error rate and jitter value in each pit are so large that the reliability is poor. In addition, the optimum range of recording laser power is not wide upon recording.

Ozawa et al., U.S. Pat. No. 4,769,307, discloses an optical recording medium using an alkoxy substituted phthalocyanine dye. However, in this medium it is essential to bond two optical recording media with their recording layers facing inside with air gap to protect the recording layer.

When a metal reflective layer and a protective layer are directly formed on the recording layer of this medium to form a medium of a single plate type and a pit length recording is effected, error rate and jitter value of each pit are so large that the reliability is low even if the recording is possible.

Tanikawa et al, U.S. Pat. No. 4,458,004, discloses an optical recording medium comprising a recording layer containing a fluorine substituted phthalocyanine dye and a transparent protective layer directly provided on the recording layer. However, the fluorine substituted phthalocyanine dye has low solubility in solvents so that it can not be formed into a film directly overlying a thermoplastic resin substrate by a coating method. In addition, the medium using this dye can not give reflectivity of 60% or more even when a metal reflective layer is furnished. Further, when information is written to this media in the manner of pit length recording it is not possible to give a pit length recording of low error rate and low jitter value.

Nakagawa et al., Japanese Patent Application Laid-open No. 191690/1988, discloses an optical recording medium having a recording layer containing substituted naphthalocyanine dyes or substituted phthalocyanine dyes. However, in this medium two media are bonded with their recording layer facing inside with an air gap to protect the recording layer, but nothing is disclosed about a medium of a single plate type capable of pit length recording where a cover layer is positioned directly on a recording layer.

There also was proposed optical recording media comprising a recording layer composed of a dye, a metal reflective layer and a protective layer provided successively on the recording layer, which is reproduced with commercially available compact disk player (for example, Optical Data Storage 1989, Technical Digest Series, Vol. 1, 45 (1989), Japanese Patent Application Laid-open Nos. 132656/1990 and 168446/1990). Though these media have a high reflectivity, the light resistance and durability are poor due to the use of cyanine dyes, and moreover, when a pit length recording is effected, the pit jitter value for each length and jitter value of pits are not small, according to the present inventors' investigation.

Ito et al., EP-373,643, discloses a medium comprising a recording layer containing tetraalkoxyphthalocyanines, and a metal reflective layer directly provided on the recording layer. Though this medium exhibits a high reflectivity, pit jitter value for each length and jitter value of pits are not small when a pit length recording is carried out. Further, an optical recording card using tetra-alkoxy-tetrabromophthalocyanine dyes is also disclosed, but nothing is disclosed about an optical recording medium of a single plate type capable of pit length recording comprising a cover layer positioned directly on a recording layer.

SUMMARY OF THE INVENTION

An object of the present invention is to provide an optical recording medium capable of pit length recording having excellent characteristics at least with respect to error rate and jitter.

Another object of the present invention is to provide an optical recording medium capable of pit length recording exhibiting inter alia high durability and high light resistance.

A further object of the present invention is to provide an optical recording medium capable of pit length recording at a high speed using a short wavelength laser.

Still another object of the present invention is to provide an optical recording method using the above-mentioned optical recording media.

Other objects and advantages will be apparent from the following description.

According to one aspect the present invention, there is provided an optical recording medium of a single plate type capable of pit length recording which comprises a transparent injection molded resin substrate, a recording layer containing a phthalocyanine dye overlying the substrate and a covering layer overlying the recording layer, the phthalocyanine dye being represented by the general formula (1),

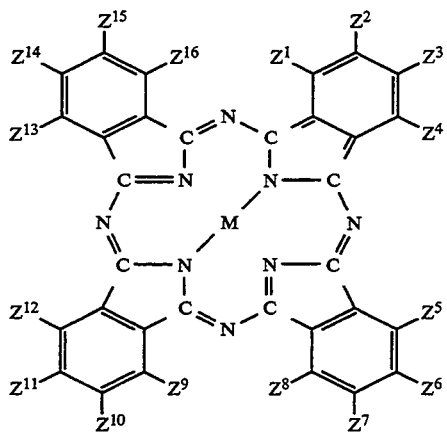

wherein M is a divalent metal and the substituents, $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$ are independently selected from the group consisting of the following substituents,

| (a) hydrogen, | (b) halogen, | (c) $R_1$, |
|---|---|---|
| (d) $OR_2$, | (e) $SR_3$, | (f) $COOR_4$, |
| (g) $COONR_5R_6$, | (h) $SiR_7R_8R_9$ and | (i) $NR_{10}R_{11}$ | where $R_1$ is selected from the group consisting of unsubstituted or substituted alkyl, aryl and unsaturated alkyl; $R_2$, $R_3$, $R_4$, $R_5$, $R_6$, $R_7$, $R_8$, $R_9$, $R_{10}$, and $R_{11}$ are independently selected from the group consisting of hydrogen, unsubstituted or substituted alkyl, aryl and unsaturated alkyl, provided that, among $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, and $Z_{16}$, one to 12 members are halogen, at least one member is hydrogen, one to 8 members are independently selected from the group consisting of the above-mentioned substituents, (c) to (i), and the total carbon number of $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$ and $Z_{16}$ is 16-100.

According to another aspect of the present invention, there is provided an optical recording method using the above-mentioned optical recording medium by means of a focused laser beam.

According to a further aspect of the present invention, there is provided the optical recording medium having information recorded by the optical recording method.

In the present invention, the number of halogen atoms attached to the phthalocyanine dye is represented by the average value.

DESCRIPTION OF THE PREFERRED EMBODIMENTS

As the transparent injection molded substrate used in the present invention, ere are preferably used substrates capable of transmitting lights for recording and readout of signals. The light transmittance is preferably 85% or higher and it is preferable that optical anisotropy is low.

Exemplary suitable substrates include substrates made of thermoplastic resins such as acrylic resins, polycarbonate resins, polyamide resins, polyvinyl chloride resins, polyolefins and the like.

Among them, from the standpoints of mechanical strength of substrate, ease of forming a guide groove and pits for information, injection molded resin substrates of acrylic resins, polycarbonate resins and polyolefins are preferable, and polycarbonate resins are more preferable.

The shape of the substrate may be plate, film, circle and card. The surface of the substrate may be provided with a guide groove indicating the recording position, pits indicating the recording position and pits for exclusive information for partly regenerating. Such guide groove, pits and the like are preferably provided when the substrates are fabricated by injection molding or cast molding, but may be provided by applying an ultraviolet light curing resin to a substrate, superposing a stamper thereon and exposing to ultraviolet light.

Examples of the substituents $Z_1$–$Z_{16}$ in the phthalocyanine dye of the formula (1) of the present invention are hydrogen, halogen such as chlorine, bromine, iodine and the like, substituted or unsubstituted alkyl, aryl, unsaturated alkyl, alkoxy, aryloxy, unsaturated alkoxy, alkylthio, arylthio, unsaturated alkylthio, carboxylic acid ester group, carboxylic amide group, silyl, amino and the like.

More particularly examples of substituents represented by $R_{1-11}$ in the above-mentioned substituents, $Z_1$–$Z_{16}$, are alkyl group: primary alkyl such as methyl, ethyl, n-propyl, n-butyl, isobutyl, n-pentyl, neopentyl, isoamyl, 2-methylbutyl, n-hexyl, 2-methylpentyl, 3-methylpentyl, 4-methylpentyl, 2-ethylbutyl, n-heptyl, 2-methylhexyl, 3-methylhexyl, 4-methylhexyl, 5-methylhexyl, 2-ethylpentyl, 3-ethylpentyl, n-octyl, 2-methylheptyl, 3-methylheptyl, 4-methylheptyl, 5-methylheptyl, 2-ethylhexyl, 3-ethylhexyl, n-nonyl, n-decyl, n-dodecyl and the like, secondary alkyl such as isopropyl, sec-butyl, 1-ethylpropyl, 1-methylbutyl, 1,2-dimethylpropyl, 1-methylheptyl, 1-ethylbutyl, 1,3-dimethylbutyl, 1,2-dimethylbutyl, 1-ethyl-2-methylpropyl, 1-methylhexyl, 1-ethylheptyl, 1-propylbutyl, 1-isopropyl-2-methylpropyl, 1-ethyl-2-methylbutyl, 1-ethyl-2-methylbutyl, 1-propyl-2-methylpropyl, 1-methylheptyl, 1-ethylhexyl, 1-propylpentyl, 1-isopropylpentyl, 1-isopropyl-2-methylbutyl, 1-isopropyl-3-methylbutyl, 1-methyloctyl, 1-ethylheptyl, 1-propylhexyl, 1-isobutyl-3-methylbutyl and the like, tertiary alkyl such as tert-butyl, tert-hexyl, tert-amyl, tert-octyl, and the like, and cycloalkyl such as cyclohexyl, 4-methylcyclohexyl, 4-ethylcyclohexyl, 4-tert-butylcyclohexyl, 4- (2-ethylhexyl) cyclohexyl, bornyl, isobornyl, adamantane group and the like; aryl groups: phenyl, ethylphenyl, butylphenyl, nonylphenyl, naphthyl, butylnaphthyl, nonylnaphthyl and the like; and unsaturated alkyl groups: vinyl, propenyl, butenyl, hexenyl, octenyl, dodecenyl, cyclohexenyl, butylhexenyl and the like.

These alkyl, aryl and unsaturated alkyl groups may be substituted with hydroxyl, halogen and the like, and may be bonded to the above-mentioned alkyl or aryl through oxygen atom, sulfur atom, nitrogen atom or the like.

Examples of alkyl and aryl bonded through oxygen atom are: methoxymethyl, methoxyethyl, ethoxymethyl, ethoxyethyl, butoxyethyl, ethoxyethoxyethyl, phenoxyethyl, methoxypropyl, ethoxypropyl, methoxphenyl, butoxyphenyl, polyoxyethylene group, polyoxypropylene group and the like.

Examples of alkyl and aryl bonded through sulfur atom are: methylthioethyl, ethylthioethyl, ethylthiopropyl, phenylthioethyl, methylthiophenyl, butylthiophenyl and the like.

Examples of alkyl and aryl bonded through nitrogen atom are: dimethylaminoethyl, diethylaminoethyl, diethylaminopropyl, dimethylaminophenyl, dibutylaminophenyl and the like.

M in the general formula (1) is preferably a divalent metal. Exemplary suitable divalent metals include Ca, Mg, Zn, Cu, Ni, Pd, Fe, Pb, Co, Pt, Cd, Ru, and the like.

In the present invention, with respect to the substituents, $Z_1-Z_{16}$, in the phthalocyanine dye represented by the general formula (1), one to 12 substituents are halogen, at least one substituent is hydrogen, and one to 8 substituents are selected from (c)–(i) as mentioned above.

If there is no halogen in the substituents, fluctuation (jitter) of the length of each recorded pit and that of the length between recorded pits become disadvantageously large when a pit length recording is effected using the recording medium.

If more than 12 halogen atoms are present or no hydrogen atom is present, the reflectivity to a light having a wavelength of 770–830 nm can not be higher than 60% even when a metal reflective layer is furnished, and therefore, recorded media can not be reproduced with commercially available CD players.

With respect to the reflectivity, it is preferable that the number of halogen atoms is at least one and less than 4 and in the combinations of $Z_1$ and $Z_4$, $Z_5$ and $Z_8$, $Z_9$ and $Z_{12}$, and $Z_{13}$ and $Z_{16}$, any one of the two is preferably selected from (c)–(e).

Further, it is preferable to select the dye in the recording layer and the thickness of the recording layer such that the maximum absorption wavelength region of the recording layer is 650–730 nm and the light absorbance of the recording layer at the wavelength of 770–830 nm is ⅓ times that at the maximum absorption wavelength or less.

In the phthalocyanine dye used in the present invention, one alpha-position of the benzenoid moieties is preferably substituted by alkyl, aryl, alkoxy, aryloxy, alkylthio, arylthio or the like.

However, the substituting position of halogen is not particularly limited and may be at the other α-position or β-position, but it is preferable that in the molecule of the dye at least one halogen is at the other α-position.

The phthalocyanine dye used in the present invention may be prepared by ordinary methods, for example, conventional methods using a phthalonitrile or diiminoisoindoline having alkyl, aryl, alkoxy, aryloxy, alkylthio, arylthio, and/or halogen as substituents as a starting material. For the purpose of reducing the number of halogen atom to less than 4, a phthalonitrile or diiminoisoindoline free of halogen may be used as a part of the starting material.

Alternatively, for example, a phthalocyanine dye having alkyl, aryl, alkoxy, aryloxy, alkylthio, and/or arylthio as substituents may be halogenated according to a conventional method. In this case, halogen is usually easily attached to the para-position (the other α-position) with respect to a substituent such as alkyl, aryl, alkoxy, aryloxy, alkylthio, arylthio and the like, but can be attached to the orth- or meta-position. The number of halogen substituent may be easily controlled by controlling the amount of halogen used for the reaction.

The phthalocyanine dye may be formed into a film usually by spin-coating, vapor deposition, sputtering or the like, but spin-coating is preferable from the standpoint of easiness of film forming.

Upon the spin-coating for forming the dye film, the dye may be dissolved in a solvent which does not adversely affect the injection molded substrate, for example, a non-polar solvent, for example, aliphatic or alicyclic hydrocarbons such as hexane, heptane, octane, decane, cyclohexane, methylcyclohexane and the like, and ethers such as diethyl ether, dibutyl ether, diisopropyl ether and the like, and a polar solvent, for example, alcohols such as methyl alcohol, ethyl alcohol, isopropyl alcohol, allyl alcohol, methyl cellosolve and the like, and then the dye thus dissolved may be applied to the substrate.

From the standpoint of solubility of the dye, it is preferable that 1–8 of the substituents $Z_1-Z_{16}$ in the dye of the general formula (1) are selected from (c)–(i) as mentioned above and the total carbon number in the substituents, $Z_1-Z_{16}$, actually attached to the dye is 16 or more.

On the other hand, when the total carbon number exceeds 100, the melting point of the dye is lowered and the reading out stability is lowered. Therefore, it is preferred that the total carbon number is 100 or less.

Upon forming the recording film, for purposes of improving recording characteristics of the dye, there may be additionally used other organic dyes such as substituted phthalocyanine dyes, substituted naphthalocyanine dyes, substituted porphyrin dyes, cyanine dyes, dithiol metal complexes, anthraquinone dyes and the like in an amount not more than about 50%, preferably not more than 20%, more preferably not more than 10% based on the total amount of the dyes used. Further there may be additionally used resins such as nitrocellulose, ethyl cellulose, acrylic resins, polystyrene resins, urethane resins and the like, leveling agents, defoaming agents and the like, the total content of the above-mentioned additional components in the recording layer is usually less than 20% by weight, preferably not more than 10% by weight, more preferably not more than 5% by weight.

The thickness of the recording layer containing the phthalocyanine dye of the general formula (1) is usually 30–500 nm, preferably 50–250 nm.

The covering layer furnished on the recording layer is a layer having a function protecting the recording layer containing the phthalocyanine dye so as to form a single plate type medium, and it may be a stiff film which is usually not less than 2 μm, preferably not less than 4 μm, in the thickness.

Although there is no particular upper limit to the film thickness, the thickness is usually not more than 200 μm.

The covering layer may have additional functions such as, for example, reflection function, thermally insulating function, light enhancing function and the like other than the function of protecting the recording layer. In such a case as above, the covering layer may be of a multilayer structure such as two layers or more. In particular, taking into consideration the interchangeability with commercially available players, it is preferable to provide a covering layer composed of a metal reflective layer and a protective layer thereon on the recording layer so as to render the reflectivity to a light of 770–830 nm in wavelength 60% or more.

Exemplary suitable covering layers include resin layers, inorganic layers, and metal layers. The resin layers may be made of acrylic resins, polycarbonate resins, ultraviolet light curing resins, electron beam curing resins, polysiloxane resins and the like. The inorganic layers may be made of aluminum oxide, silicon oxide, silicon nitride, aluminum nitride, boron nitride, magnesium fluoride, silicon carbide and the like.

The metal layers may be made of aluminum, gold, silver, copper, platinum, nickel and the like and alloys containing such metal or metals as the components. The metal film has additionally a reflection function, but does not always sufficiently function as a protective layer so that it is preferable to provide the above-mentioned resin or inorganic film on said metal film.

The thickness of the metal layer is about 30–500 nm. The covering layer may be formed by spin-coating, vapor deposition, sputtering or the like.

According to the present invention, the recording can be effected by exposing the recording layer to a focused laser beam, in particular, a semiconductor laser beam, while rotating the optical recording medium.

In general, there are two recording methods. One is a recording method comprising forming a pit at "1" of the recording bit (pit position recording) and the other is a recording method comprising actuating the recording laser power on or off at "1" of the recording bit. Therefore, various lengths of pit can be formed depending on the difference in the number of "0" between a recording bit "1" and the next recording bit "1" (pit length recording).

The pit length recording can advantageously make the recording amount larger than the recording between pit, but pits of various lengths should be recorded in a prescribed length so that a load to the recording film is large.

The recording film used in the present invention is suitable for the pit length recording. The kinds of pit lengths when a pit length recording is effected are determined depending on the method of modulation of the recording code.

Examples of the modulation manner are FM, MFM, MMFM, 8-10, EFM and the like, but the methods are not limited thereto. Among them, the EFM method which is used for compact disk and the like is preferable from the stand-point of interchangeability of electronics parts.

Recording or reproducing of signals by using the optical recording medium of the present invention may be effected by exposing the medium to a laser beam through the substrate, and a semiconductor laser having an oscillatory wavelength of 640–850 nm. The oscillation wavelength of laser of commercially available CD players is 770–830 nm, and therefore, taking the interchangeability with CD players into consideration, the recording and reproducing are generally effected by a semiconductor laser of a wavelength of 770–830 nm.

The substituted phthalocyanine dye used in the present invention has a large absorption at the wavelength of 650–730 nm, and therefore, when a laser, e.g. a semiconductor laser, a focused laser beam, having an oscillation wavelength of 650–730 nm, practically, 650–700 nm is used for recording, a high speed recording can be effected within a short time.

The substituted phthalocyanine dye used in the present invention does not have large absorption at the wavelength of 770 nm or more. Therefore, when a recording layer is provided with a metallic reflective layer, the reflectivity amounts to 60% or higher with respect to a light of a wavelength of 770–830 nm and there is interchangeability with CD players. On the other hand, though the dye does not have so large absorption with respect to a light of a wavelength of 770–830 nm, recording is possible at a low speed.

Upon recording, while the medium is rotated, the laser output on the recording film may be adjusted to about 5–12 mW. Readout may be effected by controlling the laser output to about 1/10 times that employed for recording.

The present invention is now more particularly described with reference to the following examples which are for the purpose of illustration only and are intended to imply no limitation thereon.

EXAMPLE 1

A Pd-phthalocyanine having a 1-isopropyl-isoamyloxy group attached to one α-position of each of the four benzene rings in the phthalocyanine molecule was reacted with chlorine in carbon tetrachloride at 40° C. for 3 hours to introduce average 3 chlorine atoms into one molecule of the tetra (1-isopropyl-isoamyloxy)Pd-phthalocyanine.

A 4 wt % solution of the resulting phthalocyanine dye in octane was dropped on the center portion of the surface having a guide groove of an injection molded polycarbonate resin substrate of 1.2 mm thick and 130 mm in diameter having a spiral guide groove (70 nm deep, 0.6 μm wide, 1.6 μm in pitch) and the resin substrate was rotated at 1000 rpm for 10 sec.

The resin substrate was then dried at 40° C. for 10 min. to form a recording layer substantially composed of the phthalocyanine dye only on the resin substrate.

The recording layer was 120 nm thick and the maximum absorption wavelength of the recording layer was 700 nm and there was a large absorption at a wavelength of 650–730 nm. The light absorbance at the wavelength of 700 nm was 1.1 and the light absorbance at the wavelength region of 770–830 nm was 0.3 or less.

On the resulting recording layer was formed a reflective film of gold of 60 nm thick as a covering layer by sputtering, and then to the resulting reflective film of gold was applied a ultraviolet light curing resin (DAICURE CLEAR SD-17, tradename, manufactured by Dainippon Ink K.K.) by spin-coating followed by irradiating the resin film with ultraviolet light to form a protective layer of 8 μm thick, and thus an optical recording medium was prepared. The reflectivity at the unrecorded groove portion of the resulting medium was 68% with respect to a light of a wavelength of 785 nm.

While the optical recording medium was placed on a turntable and rotated at a linear speed of 1.4 m/s, EFM signals were recorded by using a drive having an optical head carrying a semiconductor laser (oscillatory wavelength: 785 nm), controlling the laser beam such that the laser beam focused on portions of the recording layer provided on the guide groove through the resin substrate, and effecting the recording of the same EFM signals as used for compact disc on the recording surface with a laser output of 4–10 mW.

The same apparatus was used for reading out the recorded signals with an output of the semiconductor laser of 1mW at the recording surface.

When the recording laser power was 8 mW, the best error rate and jitter value were obtained, that is, the error rate was $2 \times 10^{-3}$, jitters at 3T pit and 3T between pit were 23 ns and 25 ns, respectively, and deformation of the wave shape was hardly observed and, therefore, very good recording and readout were effected.

In addition, for the purpose of investigating durability of the optical recording medium, the medium was allowed to stand in an atmosphere of high temperature and high humidity, i.e. 60° C. and 90% RH, for 3 months, and for the purpose of investigating light resistance, the medium was placed in a light resistance tester of a carbon arc type for 200 hours, and then the reflectivity of the recording film was measured, the recorded signal was read out again and newly recording was conducted again.

The reflectivity, error rate and jitter were hardly different from those at the initial stage, and therefore, substantially no deterioration of the recording layer was observed as results of the durability test and light resistance test.

EXAMPLE 2

An Ni-phthalocyanine having a bis(isopropyl)-methoxy group attached to one alpha-position of each of the four benzene rings in the phthalocyanine molecule was reacted with bromine in a way similar to in Example 1 to introduce average 2.5 atoms of bromine into one molecule of the phthalocyanine.

The precedure of Example 1 was repeated except that the phthalocyanine dye obtained above was used, and a medium was prepared. The maximum absorption wavelength of this recording layer was 710 nm, and there was a large absorption at the wavelength of 650–730 nm. The absorbance at 710 nm was 1.2 while that at the region of 770–830 nm was 0.3 or less. The reflectivity of this medium was 66% with respect to a light having wavelength of 785 nm.

Following the same procedure as in Example 1, this medium was evaluated with respect to recording and readout. Under the recording conditions of laser power of 7 mW, the best block error rate and jitter values were obtained, that is, the block error rate was $5 \times 10^{-3}$, jitter for 3T pit 22 ns, and jitter for 3T between pits 26 ns. In addition, the durability and light resistance were good.

EXAMPLES 3–6 AND COMPARATIVE EXAMPLES 1–2

The procedure of Example 1 was repeated except that there were used phthalocyanine dyes as shown in Table 1 each of which has one alkoxy group, alkylthio group, or alkyl group attached to one alpha-position of each of four benzene rings of a phthalocyanine, molecule and has halogen atom of the kind and the average number in one molecule and a metal as shown in Table 1, and a medium was prepared.

The phthalocyanine dyes used in Examples 3–5 were prepared by brominating the phthalocyanine dyes having the alkoxy group or mercaptoxy group at the α-position in the same manner as in Example 1. The phthalocyanine dye used in Example 6 was prepared by using 0.5 mole of 3-(1,3-dimethylbutoxy) phthalonitrile and 3.5 moles of 3-(1,3-dimethylbutoxy)-6-chlorophthalonitrile according to a conventional method.

Each recording layer had the maximum absorption wavelength region of 650–730 nm, and the light absorbance of the recording layer at the wavelength region of 70–830 nm was ½ times that at the maximum absorption wavelength or less.

Following the procedure of Example 1 recording and readout was evaluated. The results are shown in Table 2. Durability test and light resistance test were effected in a way similar to Example 1. In the examples of the present invention, the tested media were not deteriorated, while in the comparison examples, the reflectivity was not adversely affected, but jitter and error rate increased to a great extent.

TABLE 1

|  | Substituent | | | Metal |
|---|---|---|---|---|
|  | Type | Halogen | Number | |
| Example 3 | Bis(isobutyl)-methoxy | Bromine | 2.5 | Cu |
| Example 4 | 4-t-Butyl-cyclohexyloxy | Bromine | 3 | Pd |
| Example 5 | t-Dodecylmercaptoxy | Bromine | 2 | Ni |
| Example 6 | 1,3-Dimethylbutoxy | Chlorine | 3.5 | Pt |
| Comparative Example 1 | Bis(isobutyl)-methoxy | None |  | Cu |
| Comparative Example 2 | t-Dodecylmercaptoxy | None |  | Ni |

TABLE 2

|  | Reflectivity (%) | Error Rate | Jitter (ns) Pit | Jitter (ns) Between Pits |
|---|---|---|---|---|
| Example 3 | 62 | $2 \times 10^{-3}$ | 23 | 24 |
| Example 4 | 70 | $1 \times 10^{-3}$ | 18 | 21 |
| Example 5 | 65 | $4 \times 10^{-3}$ | 26 | 28 |
| Example 6 | 71 | $3 \times 10^{-3}$ | 25 | 27 |
| Comparative Example 1 | 62 | $2 \times 10^{-1}$ | 46 | 55 |
| Comparative Example 2 | 68 | $8 \times 10^{-2}$ | 54 | 60 |

EXAMPLE 7–11

The procedure of Example 1 was repeated except that the covering layer as shown in Table 3 was provided on the recording layer of Example 1 and a medium was manufactured and evaluated. The results are summarized in Table 4.

In a durability test and a light resistance test, good results were obtained.

TABLE 3

|  | Type of Covering Layer | Layer Thickness |
|---|---|---|
| Example 7 | Ultraviolet light curing resin A | 10 μm |
| Example 8 | Polysiloxane resin B | 8 μm |
| Example 9 | Al/Ultraviolet light curing resin C | 90 nm–10 μm |
| Example 10 | Ag/Ultraviolet light curing resin A | 150 nm–10 μm |
| Example 11 | SiO₂/Ultraviolet light curing resin A | 200 nm–10 μm |

Ultraviolet light curing resin A:
DAICURE CLEAR
(manufactured by Dainippon Ink K.K.)
Polysiloxane resin B:
Si coat 2R
(manufactured by Daihachi Kagaku K.K.)
Ultraviolet light curing resin C:
DAICURE CLEAR
(manufactured by Dainippon Ink K.K.)

TABLE 4

|  | Reflectivity (%) | Error Rate | Jitter (ns) Pit | Jitter (ns) Between Pits |
|---|---|---|---|---|
| Example 7 | 34 | $2 \times 10^{-3}$ | 24 | 25 |
| Example 8 | 38 | $4 \times 10^{-3}$ | 26 | 30 |
| Example 9 | 58 | $1 \times 10^{-3}$ | 20 | 25 |
| Example 10 | 67 | $2 \times 10^{-3}$ | 22 | 25 |
| Example 11 | 42 | $2 \times 10^{-3}$ | 25 | 26 |

EXAMPLES 12 AND 13

By means of a recorder provided with a head having a semiconductor laser of oscillation wavelength of 670 nm, EFM signals were recorded on the media of Examples 1 and 2 at linear speed of 2.8 m/s. In the case of the medium of Example 1, the error rate and jitter were minimum at the recording power of 6.5 mw, that is, this condition was the optimum recording condition. The error rate was $3 \times 10^{-3}$, and the jitter at 3T pit was 23 ns while that between 3T pits was 25 ns.

For the medium of Example 2, the optimum recording power was 6.0 mw, and under this condition, the error rate was $4 \times 10^{-3}$, and the jitter at 3T pit was 23 ns while that between 3T pits was 25 ns.

Both media gave good records at a high speed.

The information thus recorded in the media was able to be read-out with commercially available players.

What is claimed is:

1. An optical recording medium of a single plate type capable of pit length recording with excellent error rate and jitter value which comprises a transparent injection molded resin substrate, a recording layer containing a phthalocyanine dye overlying the substrate and a covering layer overlying the recording layer, wherein the phthalocyanine dye is of the formula (1),

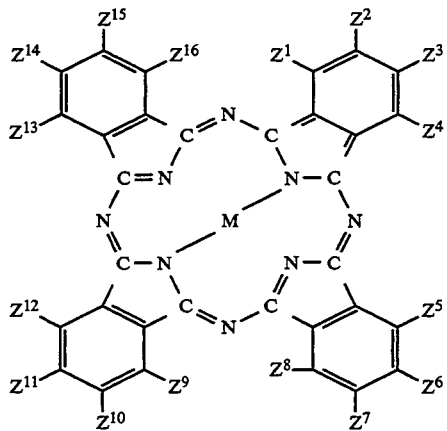

wherein M is a divalent metal and in each of the pairs of substituents, $Z_1$ and $Z_4$, $Z_5$ and $Z_8$, $Z_9$ and $Z_{12}$, and $Z_{13}$ and $Z_{16}$, one substituent of each pair is independently selected from the group consisting of (a) $R_1$,
(b) $OR_2$, and
(c) $SR_3$, wherein $R_1$, $R_2$ and $R_3$ are independently selected from the group consisting of unsubstituted or substituted alkyl, aryl and unsaturated alkyl, and the other substituent in each of the above pairs of substituents is independently selected from the group consisting of hydrogen and halogen, provided that at least one of $Z_1$, $Z_4$, $Z_5$, $Z_8$, $Z_9$, $Z_{12}$, $Z_{13}$ and $Z_{16}$ is halogen and the total number of carbon atoms in substituents $Z_1$, $Z_4$, $Z_5$, $Z_8$, $Z_9$, $Z_{12}$, $Z_{13}$ and $Z_{16}$ is 16–100;

the substituents $Z_2$, $Z_3$, $Z_6$, $Z_7$, $Z_{10}$, $Z_{11}$, $Z_{14}$ and $Z_{15}$ are independently hydrogen or halogen; and further provided that at least one of $Z_1$–$Z_{16}$ is hydrogen.

2. The optical recording medium of claim 1, in which the average number of halogens per molecule of the phthalocyanine dye of formula (1) is from 1 to less than 4.

3. The optical recording medium of claim 2, wherein the recording layer containing the dye of formula (1) has a maximum absorption wavelength of 650–730 nm and the light absorbance of the recording layer at the wavelength of 770–830 nm is ⅓ times that at the maximum absorption wavelength or less.

4. The optical recording medium of claim 1, in which the covering layer is composed of a metal reflective layer and a protective layer, and the reflectivity to light having a wavelength of 770–830 nm measured through the substrate is 60% or higher.

5. The optical recording medium of claim 1, which is capable of pit length recording by EFM.

6. The optical recording medium of claim 1, which is capable of recording by a laser having an oscillation wavelength of 650–700 nm.

7. A method for optical recording comprising pit length recording, by means of a focused laser beam, an optical recording medium which comprises a transparent injection molded resin substrate, a recording layer containing a phthalocyanine dye overlying the substrate and a covering layer overlying the recording layer, wherein the phthalocyanine dye is of the formula (1),

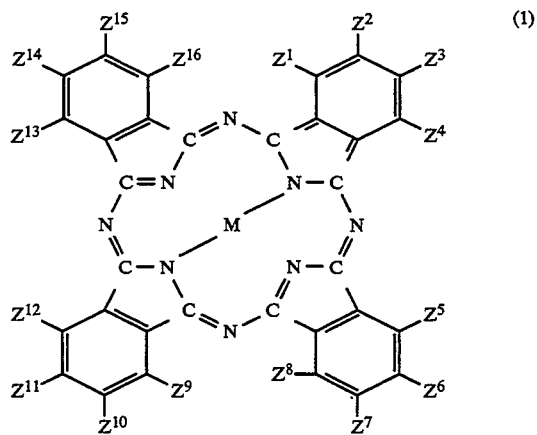

wherein M is a divalent metal and in each of the pairs of substituents, $Z_1$ and $Z_4$, $Z_5$ and $Z_8$, $Z_9$ and $Z_{12}$, and $Z_{13}$ and $Z_{16}$, one substituent of each pair is independently selected from the group consisting of (a) $R_1$,
(b) $OR_2$, and
(c) $SR_3$, wherein $R_1$, $R_2$ and $R_3$ are independently selected from the group consisting of unsubstituted or substituted alkyl, aryl and unsaturated alkyl, and the other substituent in each of the above pairs of substituents is independently selected from the group consisting of hydrogen and halogen, provided that at least one of $Z_1$, $Z_4$, $Z_5$, $Z_8$, $Z_9$, $Z_{12}$, $Z_{13}$ and $Z_{16}$ is halogen and the total number of carbon atoms in substituents $Z_1$, $Z_4$, $Z_5$, $Z_8$, $Z_9$, $Z_{12}$, $Z_{13}$ and $Z_{16}$ is 16–100;

the substituents $Z_2$, $Z_3$, $Z_6$, $Z_7$, $Z_{10}$, $Z_{11}$, $Z_{14}$ and $Z_{15}$ are independently hydrogen or halogen; and further provided that at least one of $Z_1$–$Z_{16}$ is hydrogen.

8. The optical recording method of claim 7, wherein the average number of halogens per molecule of the phthalocyanine dye of formula (1) is from 1 to less than 4.

9. The optical recording method of claim 8, wherein the recording layer containing the dye of formula (1) has a maximum absorption wavelength of 650–730 nm and the light absorbance of the recording layer at the wavelength of 770–830 nm is ⅓ times that at the maximum absorption wavelength or less.

10. The optical recording method of claim 7, in which the covering layer is composed of a metal reflective layer and a protective layer, and the reflectivity to light having a wavelength of 770–830 nm measured through the substrate is 60% or higher.

11. The optical recording method of claim 7, in which the pit length recording is effected by EFM.

12. The optical recording method of claim 7, in which the recording is effected by a focused laser beam having an oscillation wavelength of 650–700 nm.

13. An optically recorded medium which bears information recorded by a pit length recording applied to an optical recording medium set by means of a focused laser beam, wherein the optical recording medium comprises a transparent injection molded resin substrate, a recording layer containing a phthalocyanine dye overlying the substrate and a covering layer overlying the recording layer, wherein the phthalocyanine dye is of the formula (1),

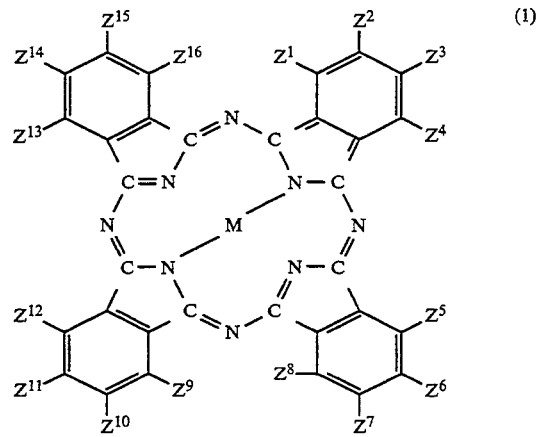

wherein M is a divalent metal and in each of the pairs of substituents, $Z_1$ and $Z_4$, $Z_5$ and $Z_8$, $Z_9$ and $Z_{12}$, and $Z_{13}$ and $Z_{16}$, one substituent of each pair is independently selected from the group consisting of
 (a) $R_1$,
 (b) $OR_2$, and
 (c) $SR_3$,
wherein $R_1$, $R_2$ and $R_3$ are independently selected from the group consisting of unsubstituted or substituted alkyl, aryl and unsaturated alkyl, and the other substituent in each of the above pairs of substituents is independently selected from the group consisting of hydrogen and halogen, provided that at least one of $Z_1$, $Z_4$, $Z_5$, $Z_8$, $Z_9$, $Z_{12}$, $Z_{13}$ and $Z_{16}$ is halogen and the total number of carbon atoms in substituents $Z_1$, $Z_4$, $Z_5$, $Z_8$, $Z_9$, $Z_{12}$, $Z_{13}$ and $Z_{16}$ is 16–100;

the substituents $Z_2$, $Z_3$, $Z_6$, $Z_7$, $Z_{10}$, $Z_{11}$, $Z_{14}$ and $Z_{15}$ are independently hydrogen or halogen; and further provided that at least one of $Z_1$–$Z_{16}$ is hydrogen.

14. The optically recorded medium of claim 13, in which the average number of halogens per molecule of the phthalocyanine dye of formula (1) is from 1 to less than 4.

15. The optically recorded medium of claim 14, wherein the recording layer containing the dye of formula (1) has a maximum absorption wavelength of 650–730 nm and the light absorbance of the recording layer at the wavelength of 770–830 nm is ⅓ times that at the maximum absorption wavelength or less.

16. The optically recorded medium of claim 13, in which the covering layer is composed of a metal reflective layer and a protective layer, and the reflectivity to light having a wavelength of 770–830 nm measured through the substrate is 60% or higher.

17. The optically recorded medium of claim 13, in which the pit length recording was effected by EFM.

18. The optically recorded medium of claim 13, in which the recording was effected by a focused laser beam having an oscillation wavelength of 650–700 nm.

* * * * *